Patented Jan. 7, 1941

2,227,823

UNITED STATES PATENT OFFICE 2,227,823

BUTYL 12-KETOSTEARATE

Henry L. Cox, South Charleston, W. Va., assignor, by mesne assignments, to Union Carbide and Carbon Corporation, a corporation of New York No Drawing. Original application June 7, 1934, Serial No. 729,442, now Patent No. 2,180,730, dated November 21, 1939. Divided and this application December 10, 1938, Serial No. 244,924

1 Claim. (Cl. 260—410)

The invention relates to a new chemical compound, in particular the butyl ester of 12-ketostearic acid.

This compound is a solid waxy material at atmospheric temperatures, and it exhibits properties especially desirable as a stabilizer and plasticizer in lacquer and plastic compositions formulated from natural and synthetic gums and resins.

The 12-ketostearic acid may be prepared by oxidizing 12-hydroxy-stearic acid,

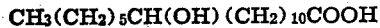

which in turn can be synthesized from castor oil. Castor oil consists chiefly of the glyceride of ricinoleic acid, or triricinolein, which when hydrogenated, saponified with sodium hydroxide, and then hydrolyzed with acid, will yield the above hydroxystearic acid. By further treatment of this acid with chromic acid, or other oxidizing agent, a carbonyl group is formed at the 12 position of the molecule, and the resulting product is 12-ketostearic acid. By reaction with butyl alcohol, an ester of this ketostearic acid may be formed.

As illustrative of the manner of preparing the 12-ketostearic acid, and the ester, the following examples are given:

Example 1

Castor oil was treated in the manner previously indicated, and a quantity of 12-hydroxystearic acid was obtained and identified by its known properties. 150 grams of this hydroxystearic acid was dissolved in 250 grams of acetic acid. With constant stirring a mixture of 30 grams of chromic acid (CrO$_3$) in 500 grams of acetic acid was gradually added at a temperature of 30° to 35° C. After the reaction was complete, the whole was poured into several volumes of water, and a crude product crystallized out. This was dissolved in methanol, again precipitated with water, and then dried. A final yield of 120 grams was obtained, which had an acetyl number of substantially zero, and an equivalent weight and other properties indicating the product 12-ketostearic acid, which may be represented by the structural formula

Example 2

Butanol in an excess of one mol was heated with 12-ketostearic acid in the presence of catalytic proportions of sulfuric acid. After completion of the reaction the mixture was neutralized with a dilute sodium hydroxide solution and distilled. The fraction distilling at 208° to 212° C. at 2 mm. pressure was collected. This product was identified from its equivalent weight and other properties as butyl 12-ketostearate. It was a wax-like solid having a melting point of 56° C., and the probable structural formula

The invention should not be limited other than as defined in the appended claim. This application is a division of my copending application Serial No. 729,442, filed June 7, 1934, now Patent No. 2,180,730.

I claim:

Butyl 12-ketostearate.

HENRY L. COX.